(12) United States Patent
Sogamoto et al.

(10) Patent No.: US 12,196,253 B2
(45) Date of Patent: Jan. 14, 2025

(54) OPENING AND CLOSING DEVICE

(71) Applicant: AISIN CORPORATION, Kariya (JP)

(72) Inventors: Daichi Sogamoto, Kariya (JP);
Kimihide Kato, Kariya (JP); Takayuki
Sengoku, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/352,599

(22) Filed: Jul. 14, 2023

(65) Prior Publication Data
US 2024/0044361 A1 Feb. 8, 2024

(30) Foreign Application Priority Data

Aug. 3, 2022 (JP) ................. 2022-123992

(51) Int. Cl.
F16C 11/06 (2006.01)
E05F 15/611 (2015.01)
E05F 15/622 (2015.01)

(52) U.S. Cl.
CPC ........ F16C 11/0695 (2013.01); E05F 15/611 (2015.01); F16C 11/069 (2013.01); E05F 15/622 (2015.01); E05Y 2600/502 (2013.01); E05Y 2900/546 (2013.01)

(58) Field of Classification Search
CPC ........ E05F 15/622; E05F 15/00; E05F 15/53; E05F 15/50; E05F 1/1091; Y10T 403/32713; Y10T 403/32721; Y10T 403/32631; Y10T 403/32737; F16C 11/069; F16C 11/0695; F16C 11/0623; F16C 11/0633; F16C 11/0657; F16C 11/0685; F16C 11/06; E05Y 2600/53

See application file for complete search history.

(56) References Cited

U.S. PATENT DOCUMENTS

| 3,527,485 A | * | 9/1970 | Goward | F16L 37/144 285/305 |
| 4,118,131 A | * | 10/1978 | Schnitzius | F16F 9/54 403/141 |
| 4,367,968 A | * | 1/1983 | Ishida | F16C 11/069 403/379.5 |

(Continued)

FOREIGN PATENT DOCUMENTS

JP 2015-505015 A 2/2015
JP 5963880 B2 8/2016

Primary Examiner — Justin B Rephann
(74) Attorney, Agent, or Firm — Oblon, McClelland, Maier & Neustadt, L.L.P.

(57) ABSTRACT

An opening and closing device couples a vehicle body having an opening to a body that opens and closes the opening, at least one of the vehicle body and the body including a ball stud including a ball, the opening and closing device including: a shaft member; a socket fixed to an end of the shaft member, including a housing portion that houses the ball, and constituting a ball joint together with the ball; an elastic body supported by the socket and holding the ball with the socket; and a cover mounted at a restricting position where displacement of the elastic body relative to the socket is restricted. The cover includes two side walls sandwiching the housing portion, one of the housing portion and the side walls has a recess, and the other has a protrusion fitted into the recess when the cover is at the restricting position.

14 Claims, 10 Drawing Sheets

(56) References Cited

U.S. PATENT DOCUMENTS

| | | | | |
|---|---|---|---|---|
| 4,410,295 | A * | 10/1983 | Ersoy | F16C 11/0685 |
| | | | | 29/418 |
| 4,482,266 | A * | 11/1984 | Kaneko | F16C 11/0623 |
| | | | | 403/135 |
| 4,568,216 | A * | 2/1986 | Mizusawa | F16C 11/0657 |
| | | | | 403/143 |
| 5,613,792 | A * | 3/1997 | Terada | F16C 11/0657 |
| | | | | 403/135 |
| 9,291,194 | B2 * | 3/2016 | Strobel | F16C 11/0638 |
| 10,036,191 | B2 * | 7/2018 | Katsuyama | E05F 15/622 |
| 2007/0253765 | A1 * | 11/2007 | Knopp | F16C 11/0638 |
| | | | | 403/122 |
| 2009/0097908 | A1 * | 4/2009 | Asa | F16F 9/38 |
| | | | | 403/122 |
| 2014/0137477 | A1 * | 5/2014 | Ooe | E05F 15/622 |
| | | | | 49/358 |
| 2014/0212205 | A1 * | 7/2014 | Forthaus | F16C 11/0685 |
| | | | | 29/451 |
| 2014/0366662 | A1 | 12/2014 | Fischer | |
| 2014/0376991 | A1 * | 12/2014 | Strobel | F16C 11/0638 |
| | | | | 403/133 |
| 2016/0312822 | A1 * | 10/2016 | Hermansson | F16C 1/14 |
| 2017/0089113 | A1 * | 3/2017 | Katsuyama | E05F 15/622 |
| 2019/0063490 | A1 * | 2/2019 | Sakiyama | F16C 11/0623 |
| 2019/0285113 | A1 * | 9/2019 | Riley | B62D 65/02 |
| 2022/0333637 | A1 * | 10/2022 | Jakobsmeyer | F16C 11/106 |

* cited by examiner

OPENING AND CLOSING DEVICE

CROSS REFERENCE TO RELATED APPLICATIONS

This application is based on and claims priority under 35 U.S.C. § 119 to Japanese Patent Application No. 2022-123992, filed on Aug. 3, 2022, the entire content of which is incorporated herein by reference.

TECHNICAL FIELD

This disclosure relates to an opening and closing device.

BACKGROUND DISCUSSION

JP 2015-505015 A discloses a vehicle including a vehicle body having a door opening, a back door that opens and closes the door opening, and an opening and closing device that drives the back door. The opening and closing device has a shaft shape and is configured to be telescopic in an axial direction. The opening and closing device includes a socket that constitutes a ball joint together with a ball fixed to the vehicle body at a first end in the axial direction. On the other hand, the opening and closing device includes a socket that constitutes a ball joint together with a ball fixed to the door at a second end in the axial direction. In this way, the opposite end portions in the axial direction of the opening and closing device are individually coupled to the vehicle body and the back door. The opening and closing device extends to perform an opening operation of the back door. On the other hand, the opening and closing device contracts to perform a closing operation of the back door.

A need thus exists for an opening and closing device which is not susceptible to the drawback mentioned above.

SUMMARY

An opening and closing device couples together a vehicle body having an opening and an opening and closing body that opens and closes the opening, and extends to perform an opening operation of the opening and closing body, at least one of the vehicle body and the opening and closing body including a ball stud including a ball, the opening and closing device including: a shaft member having a shaft shape and being telescopic in an axial direction; a socket fixed to at least one end portion of the shaft member, including a housing portion configured to house the ball, and constituting a ball joint together with the ball; an elastic body supported by the socket and configured to hold the ball together with the socket; and a cover mounted at a restricting position where displacement of the elastic body with respect to the socket is restricted, wherein when a direction in which the ball is inserted into the socket is defined as an insertion direction, the cover includes two side walls that sandwich the housing portion in a direction perpendicular to the insertion direction, one of the housing portion and the side walls has a recess, and the other of the housing portion and the side walls has a protrusion that is fitted into the recess when the cover is located at the restricting position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle including an opening and closing device will be explained.

Configuration of Present Embodiment

Figure 1:
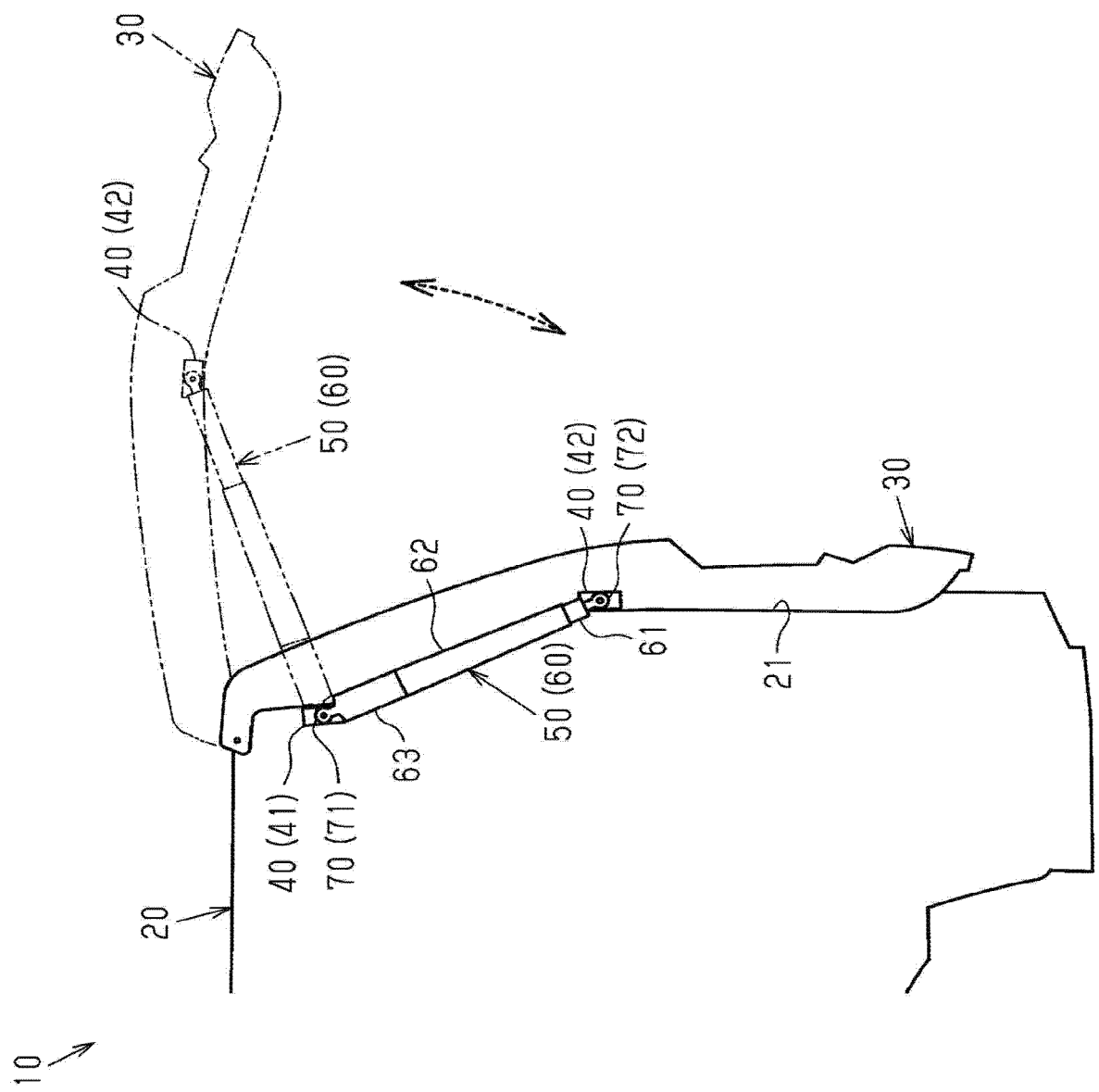
FIG. 1 is a side view of a rear portion of a vehicle.

As illustrated in FIG. 1, a vehicle 10 includes a vehicle body 20, a back door 30, and two opening and closing devices 50.

<Vehicle Body 20>

The vehicle body 20 includes a door opening 21 that opens rearward and two ball studs 41 (40) provided on opposite sides of the door opening 21. The door opening 21 has, for example, a rectangular shape whose longer direction coincides with a width direction of the vehicle 10 and whose shorter direction coincides with a vertical direction of the vehicle 10. The door opening 21 corresponds to an "opening". The ball studs 41 are located closer to an upper end than to a lower end of the door opening 21.

Figure 2:
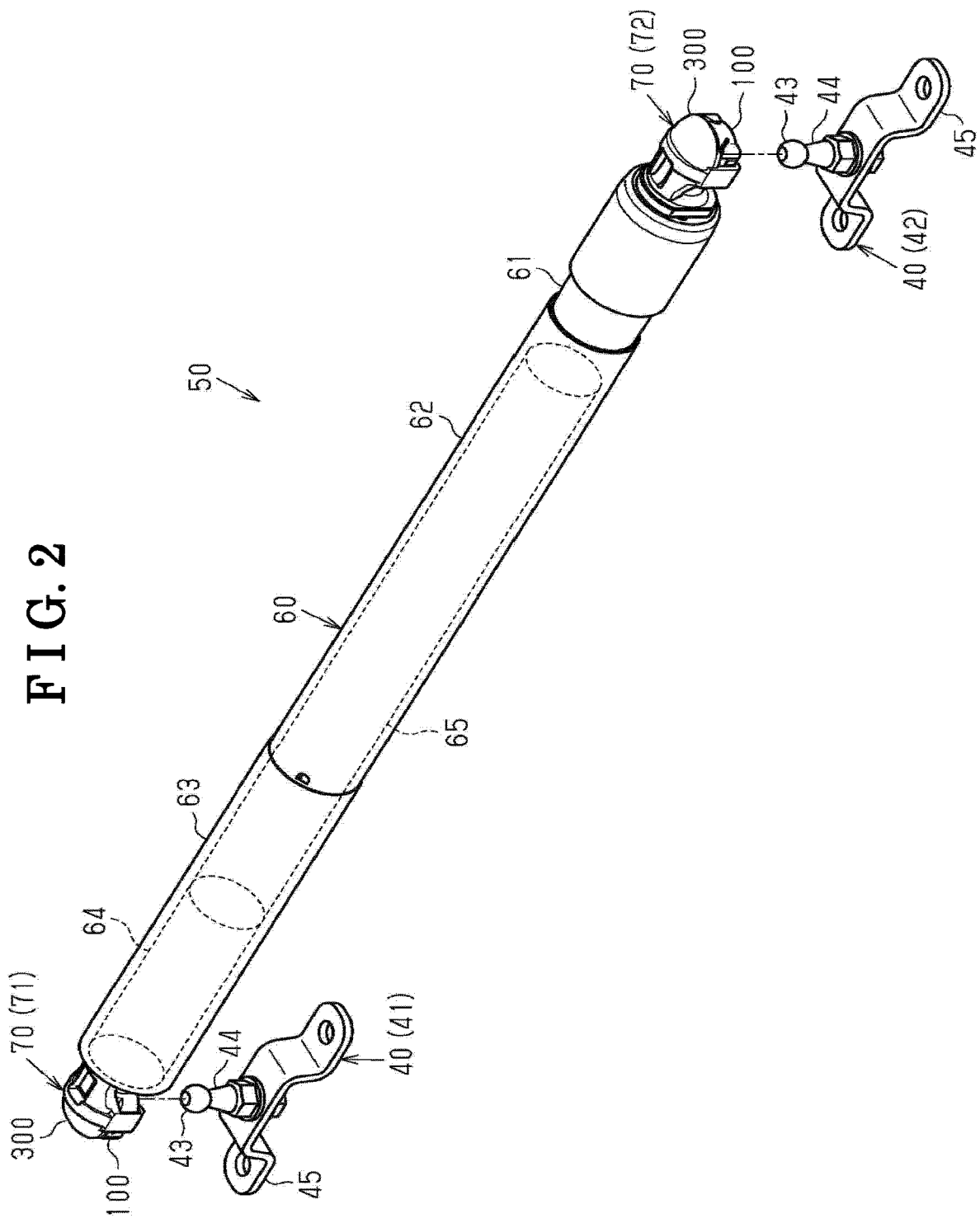
FIG. 2 is a perspective view of an opening and closing device.

As illustrated in FIG. 2, each of the ball studs 41 includes a ball 43, a shaft portion 44 that extends from the ball 43, and a bracket 45 that supports the shaft portion 44. The ball 43 has a spherical shape. The shaft portion 44 has a columnar shape. When an end portion of the shaft portion 44 connected to the ball 43 is defined as a distal end and an end portion of the shaft portion 44 connected to the bracket 45 is defined as a proximal end, a diameter of the shaft portion 44 gradually decreases from the proximal end toward the distal end. The bracket 45 is fixed to the vehicle body 20 by, for example, a fastening member such as a screw.

<Back Door 30>

As illustrated in FIG. 1, the back door 30 has a shape corresponding to the door opening 21. The back door 30 is supported by the vehicle body 20 via a hinge or the like so as to be rotatable about a swing axis extending in the width direction of the vehicle 10. The back door 30 rotates about the swing axis to be displaced between a fully opened position where the door opening 21 is fully opened and a fully closed position where the door opening 21 is fully closed. The fully opened position of the back door 30 is a position indicated by a two-dot chain line in FIG. 1, and the fully closed position of the back door 30 is a position indicated by a solid line in FIG. 1. The back door 30 corresponds to an "opening and closing body".

In the following description, in side view of the vehicle 10, an end portion of the back door 30 supported by the vehicle body 20 is referred to as a "proximal end portion", and an end portion opposite to the proximal end portion is referred to as a "distal end portion". In addition, a direction in which the back door 30 moves from the fully closed position to the fully opened position is referred to as an "opening direction", and a direction in which the back door 30 moves from the fully opened position to the fully closed position is referred to as a "closing direction".

The back door 30 includes two ball studs 42 (40) provided on the opposite sides of the door opening 21. Each of the ball studs 42 is fixed at a position closer to the proximal end than to the distal end of the back door 30. As illustrated in FIG. 2, each ball stud 42 has the same configuration as the ball stud 41 provided on the vehicle body 20.

<Opening and Closing Device 50>

As illustrated in FIGS. 1 and 2, each opening and closing device 50 is an elongated shaft-shaped member. FIG. 1 illustrates only the opening and closing device 50 on one side in the width direction of the vehicle 10. The opening and closing device 50 on one side couples together the ball stud 41 of the vehicle body 20 and the ball stud 42 of the back door 30 on the right side in the width direction of the vehicle 10. The opening and closing device 50 on the other side couples together the ball stud 41 of the vehicle body 20 and the ball stud 42 of the back door 30 on the left side in the width direction of the vehicle 10. In the following description, an axial direction of the opening and closing device 50 is simply referred to as an "axial direction". As illustrated in FIG. 2, the opening and closing device 50 includes a linear motion actuator 60 and two coupling portions 70 (71, 72).

<Linear Motion Actuator 60>

The linear motion actuator 60 is a portion excluding opposite end portions of the opening and closing device 50. The linear motion actuator 60 corresponds to a shaft-shaped telescopic "shaft member". The linear motion actuator 60 includes an inner tube 61, an outer tube 62, a motor case 63, an electric motor 64, and a transmission mechanism 65.

The inner tube 61 and the outer tube 62 have a tubular shape. An outer diameter of the inner tube 61 is smaller than an inner diameter of the outer tube 62. A first end of the inner tube 61 is inserted into a second end of the outer tube 62. The inner tube 61 is movable in the axial direction with respect to the outer tube 62. The motor case 63 has a tubular shape similarly to the outer tube 62. A second end of the motor case 63 is coupled to a first end of the outer tube 62.

The electric motor 64 is housed in the motor case 63 together with a drive circuit (not illustrated). The electric motor 64 is driven on the basis of, for example, electric power supplied from a battery of the vehicle 10. In FIG. 2, power supply lines and signal lines extending from the electric motor 64 and the drive circuit are omitted.

The transmission mechanism 65 is housed over the inner tube 61, the outer tube 62, and the motor case 63. The transmission mechanism 65 converts rotational motion of an output shaft of the electric motor 64 into linear motion in the axial direction of the inner tube 61. For example, the transmission mechanism 65 can include a speed reducer and a feed screw mechanism.

The linear motion actuator 60 extends by rotating the output shaft of the electric motor 64 in a first rotation direction. At this time, a protrusion amount of the inner tube 61 with respect to the outer tube 62 increases. In this way, the linear motion actuator 60 applies a load in the opening direction to the back door 30 to perform an opening operation of the back door 30. On the other hand, the linear motion actuator 60 contracts by rotating the output shaft of the electric motor 64 in a second rotation direction opposite to the first rotation direction. At this time, the protrusion amount of the inner tube 61 with respect to the outer tube 62 decreases. In this way, the linear motion actuator 60 applies a load in the closing direction to the back door 30 to perform a closing operation of the back door 30.

<Coupling Portion 70>

As illustrated in FIG. 2, the coupling portions 70 include the coupling portion 71 fixed to a first end in the axial direction of the linear motion actuator 60 and the coupling portion 72 fixed to a second end in the axial direction of the linear motion actuator 60. As illustrated in FIG. 1, when the opening and closing device 50 is attached to the vehicle 10, the coupling portion 71 is coupled to the ball stud 41 of the vehicle body 20, and the coupling portion 72 is coupled to the ball stud 42 of the back door 30. In the linear motion actuator 60, the two coupling portions 70 have the same configuration.

Figure 3:
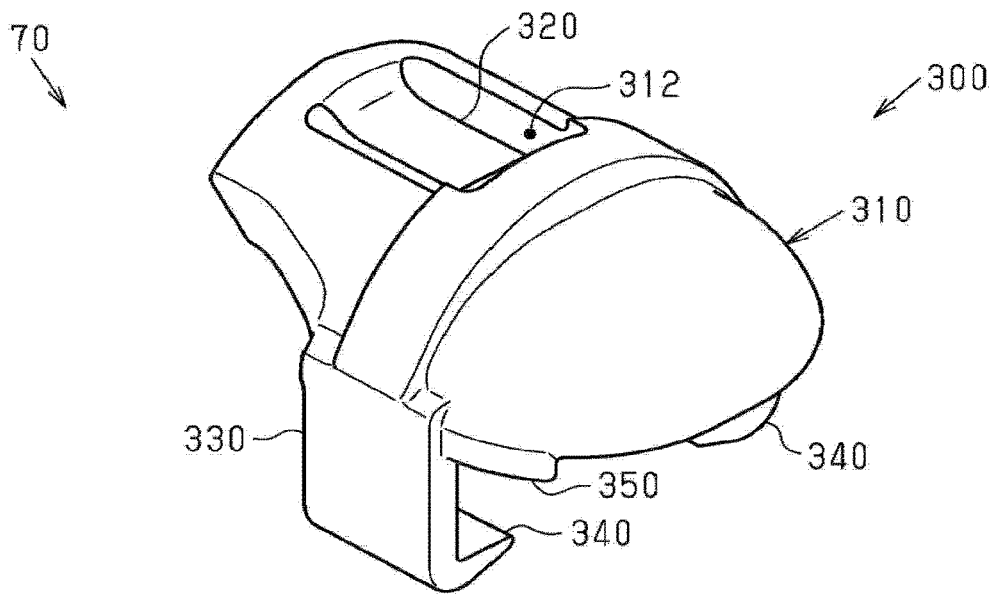
FIG. 3 is an exploded perspective view of a coupling portion of the opening and closing device.
Figure 3:
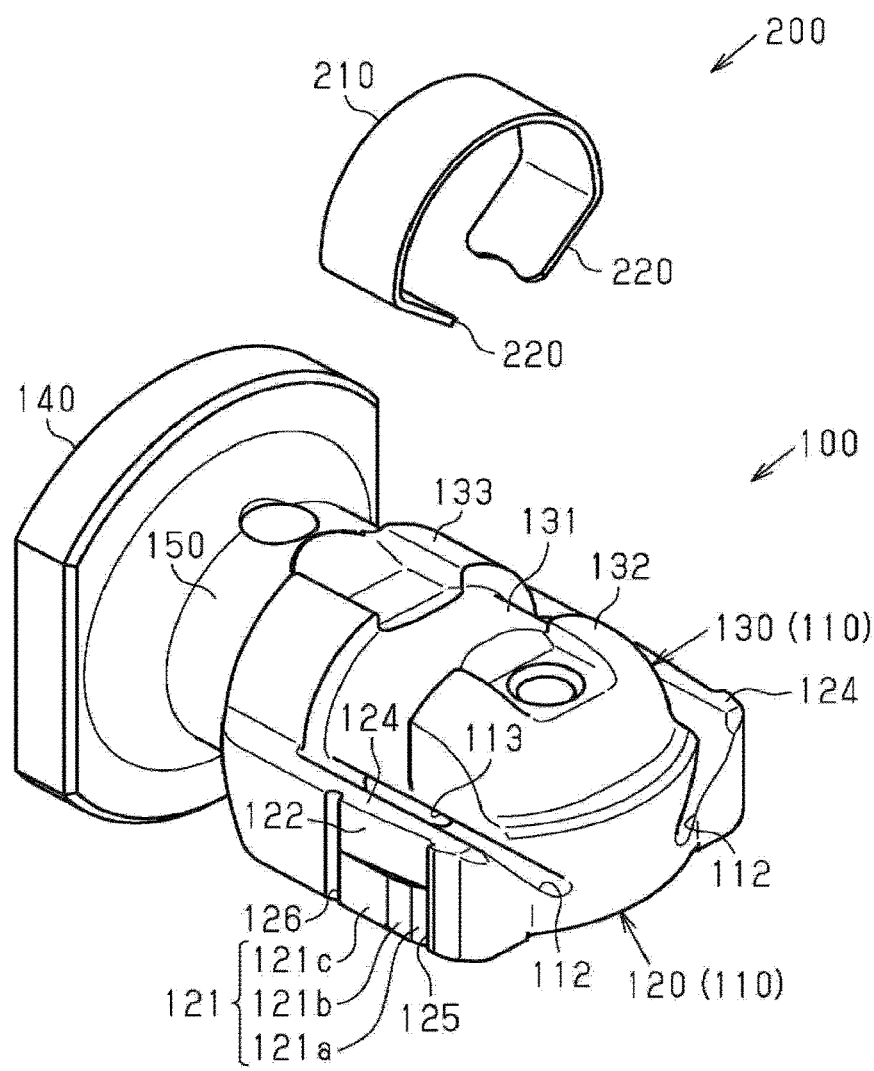
Figure 4:
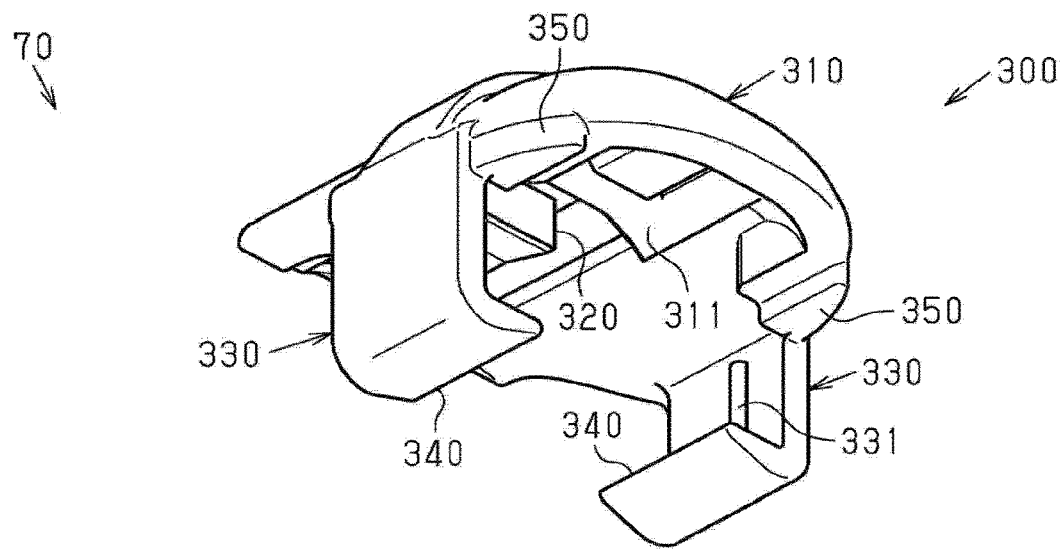
FIG. 4 is an exploded perspective view of the coupling portion.
Figure 4:
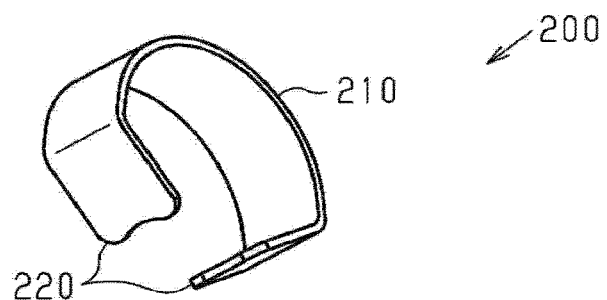
Figure 4:
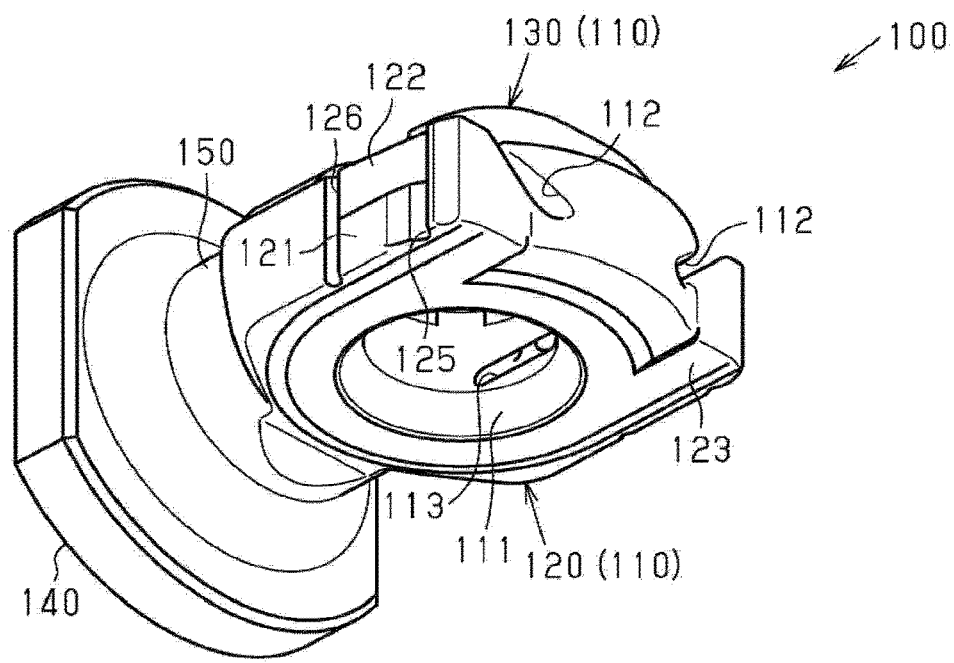
Figure 5:
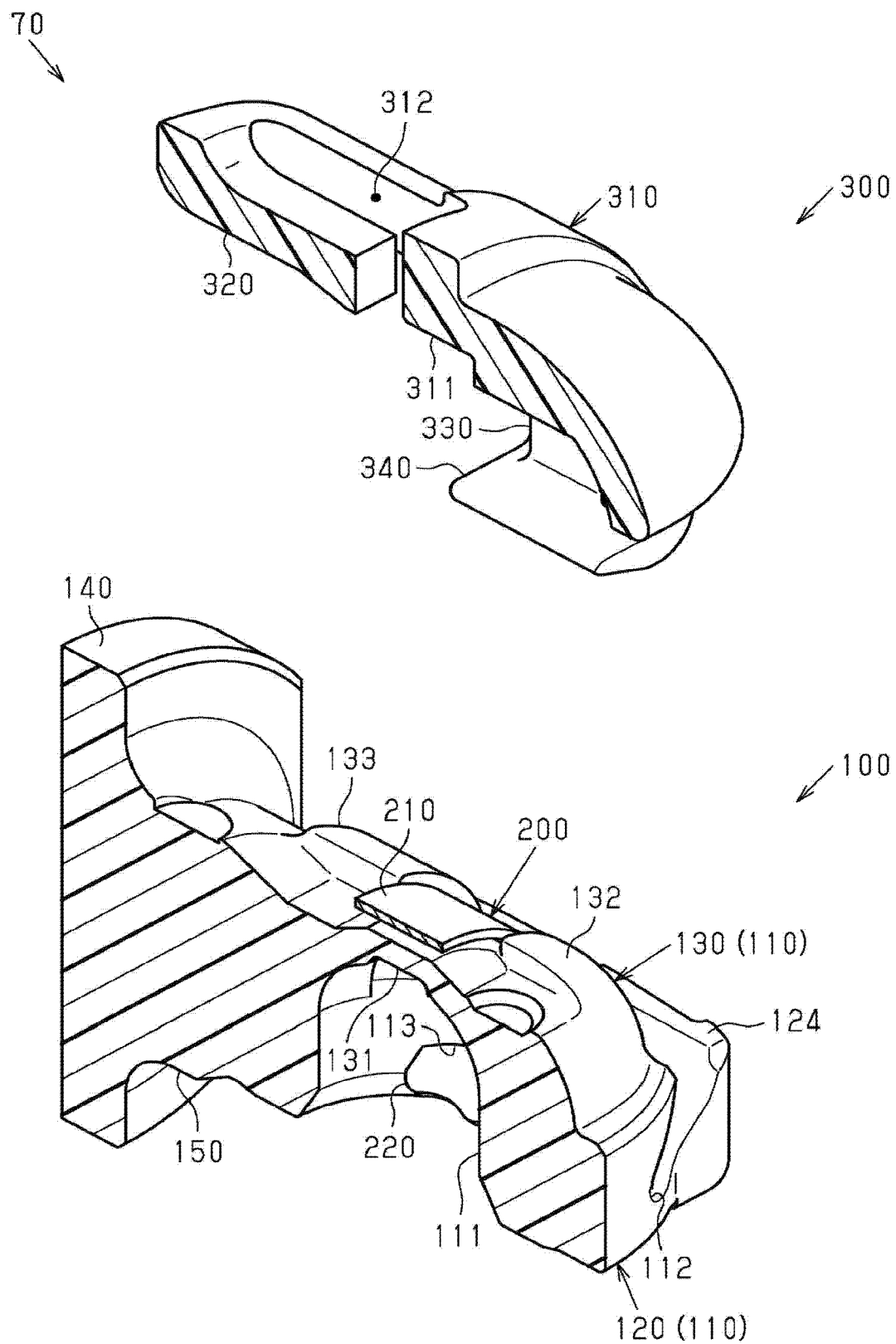
FIG. 5 is an exploded perspective view of the coupling portion.

As illustrated in FIGS. 3 to 5, each of the coupling portions 70 includes a socket 100, a plate spring 200, and a cover 300. In the following description, a direction perpendicular to the axial direction is referred to as a "width direction", and a direction perpendicular to both the axial direction and the width direction is referred to as a "vertical direction". Furthermore, in the axial direction, an end portion of the coupling portion 70 fixed to the linear motion actuator 60 is referred to as a proximal end, and an end portion on an opposite side to the proximal end of the coupling portion 70 is referred to as a distal end. The width direction and the vertical direction of the coupling portion 70 are independent of the width direction and the vertical direction of the vehicle 10.

<Socket 100>

As illustrated in FIGS. 3 to 5, the socket 100 includes a housing portion 110 that houses the ball 43 of the ball stud 40, a fixing portion 140 fixed to the linear motion actuator 60, and a connecting portion 150 that connects the housing portion 110 and the fixing portion 140. The socket 100 is preferably made of a resin material having high strength and capable of injection molding.

The housing portion 110 includes a first housing wall 120 constituting a lower side of the housing portion 110 and a second housing wall 130 constituting an upper side of the housing portion 110. The housing portion 110 also includes a housing hole 111 having an upward depth direction and two guide grooves 112 extending in the axial direction.

The first housing wall 120 has a cylindrical shape whose height direction coincides with the vertical direction. The first housing wall 120 includes two sliding surfaces 121 and two retracted surfaces 122 intersecting the width direction and a first locking surface 123 and two second locking surfaces 124 intersecting the vertical direction. The first housing wall 120 also has a first recess 125 and a second recess 126 located on opposite sides in the axial direction of each of the two sliding surfaces 121.

Figure 6:
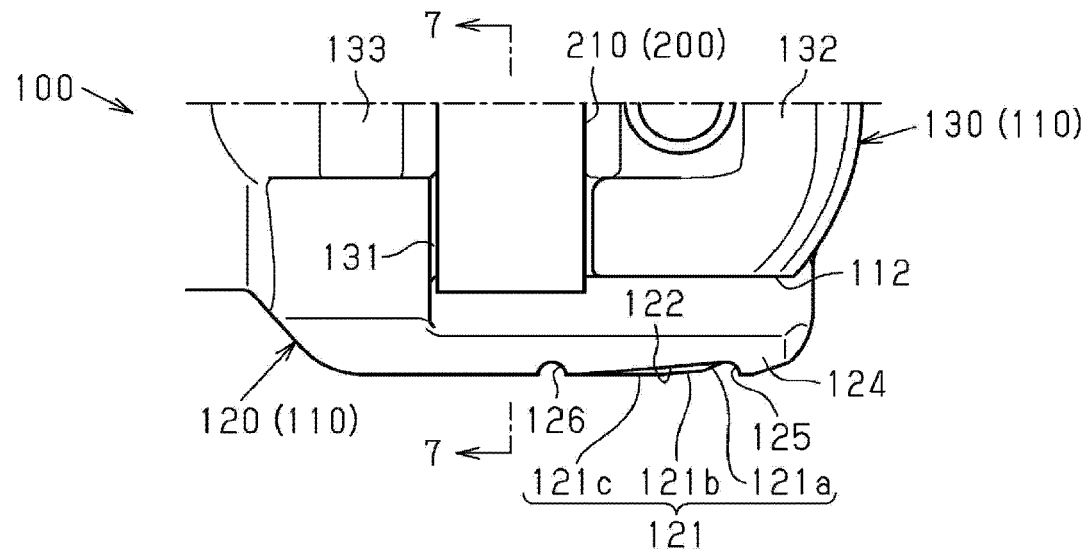
FIG. 6 is a plan view of the coupling portion excluding a cover.

As illustrated in FIGS. 3 and 6, the two sliding surfaces 121 are side surfaces in the width direction of the first housing wall 120. Each of the sliding surfaces 121 includes a first sliding surface 121*a*, a second sliding surface 121*b*, and a third sliding surface 121*c*. The first sliding surface 121*a* is connected to the first recess 125 in the axial direction, and the third sliding surface 121*c* is connected to the second recess 126 in the axial direction. The second sliding surface 121*b* connects the first sliding surface 121*a* and the third sliding surface 121*c* in the axial direction. In other words, the second sliding surface 121*b* is connected to the first sliding surface 121*a* and extends toward the second recess 126 in the axial direction. Each of the retracted surfaces 122 connects the first recess 125 and the second recess 126 in the axial direction. The retracted surface 122 is connected to the first sliding surface 121*a*, the second sliding surface 121*b*, and the third sliding surface 121*c* in the vertical direction.

Among the first sliding surface 121*a*, the second sliding surface 121*b*, and the third sliding surface 121*c*, the first sliding surface 121*a* has the shortest axial length, and the third sliding surface 121*c* has the longest length in the axial direction. An length of the retracted surface 122 in the axial direction is equal to the sum of lengths in the axial direction of the first sliding surface 121*a*, the second sliding surface 121*b*, and the third sliding surface 121*c*. Respective lengths of the first sliding surface 121*a*, the second sliding surface 121*b*, and the third sliding surface 121*c* are equal one another in the vertical direction. The vertical length of the first sliding surface 121*a*, the second sliding surface 121*b*, and the third sliding surface 121*c* is equal to a length in the vertical direction of the retracted surface 122.

The first sliding surface 121*a* has a larger inclination with respect to the axial direction than the second sliding surface 121*b* and the third sliding surface 121*c*. The second sliding surface 121*b* has a larger inclination with respect to the axial direction than the third sliding surface 121*c*. The third sliding surface 121*c* extends along the axial direction. Therefore, the third sliding surface 121*c* has the smallest inclination with respect to the axial direction. The inclination with respect to the axial direction is an angle formed between the surface and the axial direction. For example, the surface having a large inclination with respect to the axial direction is a surface that advances outward in the width direction from a distal end toward a proximal end of the socket 100 by a large amount. The retracted surface 122 is retracted inward in the width direction as compared with the first sliding surface 121*a*, the second sliding surface 121*b*, and the third sliding surface 121*c*.

The first recess 125 is provided close to the distal end of the socket 100. The second recess 126 is provided closer to the proximal end of the socket 100 than the first recess 125 is. The first recess 125 and the second recess 126 have a groove shape extending in the vertical direction. The vertical direction, which is a direction in which the first recess 125 and the second recess 126 extend, corresponds to an "extending direction".

Cross-sectional shapes perpendicular to the vertical direction of the first recess 125 and the second recess 126 are semicircular shapes. An inner peripheral surface of the first recess 125 and the first sliding surface 121*a* are continuous, whereas an inner peripheral surface of the second recess 126, the third sliding surface 121*c*, and the retracted surface 122 are discontinuous. In another embodiment, the inner peripheral surface of the first recess 125 and the first sliding surface 121*a* may be discontinuous.

In the vertical direction, the first recess 125 is shorter than the second recess 126. Specifically, a length in the vertical direction of the second recess 126 is a total value of vertical lengths of the first sliding surface 121*a* and the retracted surface 122, whereas a vertical length of the first recess 125 is equal to the vertical length of the first sliding surface 121*a*. The socket 100 corresponds to a "second member" in having the first recess 125 and the second recess 126.

Here, lengths of edges extending in the vertical direction are equal on opposite sides in the axial direction of the second recess 126, whereas lengths of edges extending in the vertical direction are different on opposite sides in the axial direction of the first recess 125. Specifically, a length of an edge on the distal end side of the first recess 125, a length of an edge on the distal end side of the second recess 126, and a length of an edge on the proximal end side of the second recess 126 are equal to each other. Specifically, the length of these edges is equal to the lengths in the vertical direction of the sliding surface 121 and the retracted surface 122. On the other hand, a length of an edge on the proximal end side of the first recess 125 is shorter than the length of the edge on the distal end side of the first recess 125. Specifically, the length of the edge on the proximal end side of the first recess 125 is equal to the length in the vertical direction of the sliding surface 121.

Figure 7:
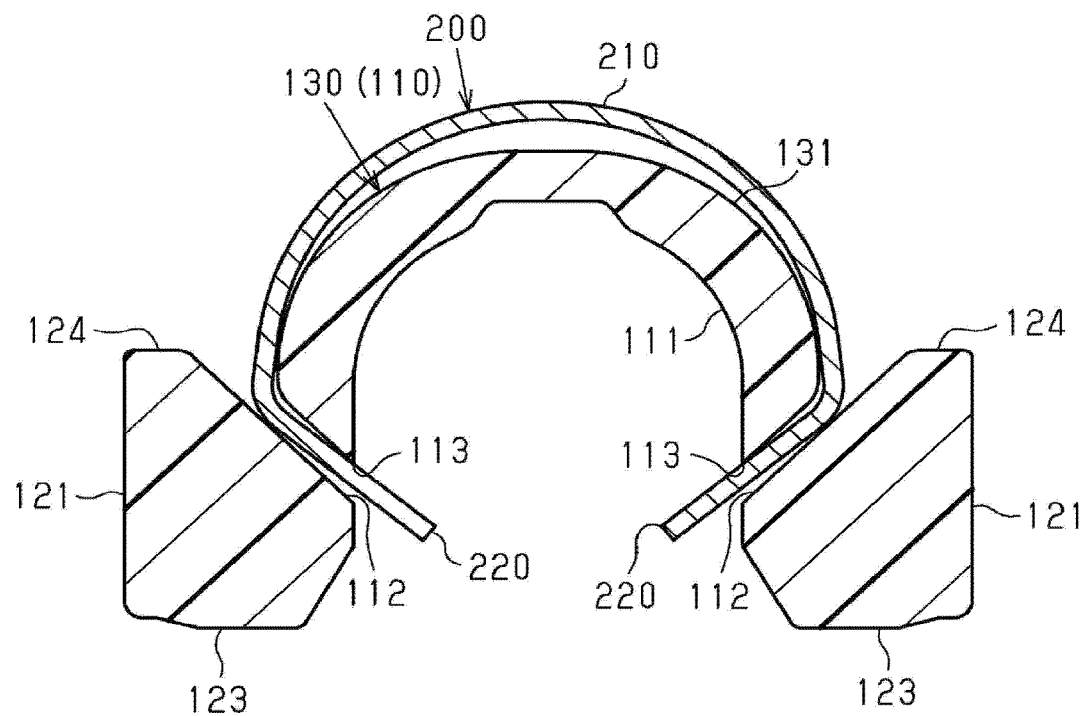
FIG. 7 is a cross-sectional view taken along line VII-VII in FIG. 6.

As illustrated in FIGS. 4 and 7, the first locking surface 123 is a bottom surface of the first housing wall 120. In the present embodiment, the first locking surface 123 and the two sliding surfaces 121 are perpendicular to each other. As illustrated in FIGS. 3 and 7, the two second locking surfaces 124 are upper surfaces of the first housing wall 120. The two second locking surfaces 124 are located on opposite sides in the width direction of the first housing wall 120. In each of the two second locking surfaces 124, the shorter direction coincides with the width direction and the longer direction coincides with the axial direction. In the present embodiment, the two second locking surfaces 124 and the two sliding surfaces 121 are perpendicular to each other. In other words, the two second locking surfaces 124 and the first locking surface 123 are parallel to each other.

As illustrated in FIG. 3, the second housing wall 130 covers the first housing wall 120 from above. The second housing wall 130 includes a peripheral wall 131 having an arc shape as viewed from the axial direction, and a front wall 132 and a rear wall 133 adjacent to the peripheral wall 131 viewed in the axial direction. An outer diameter of the peripheral wall 131 is smaller than an outer diameter of the front wall 132 and an outer diameter of the rear wall 133. Therefore, a step is formed between the peripheral wall 131 and the front wall 132 and between the peripheral wall 131 and the rear wall 133 in the axial direction. In addition, the centers in the width direction of the front wall 132 and the rear wall 133 are provided with recesses.

The two guide grooves 112 extend from a distal end toward a proximal end of the first housing wall 120 in the axial direction. The two guide grooves 112 are located at an interval in the width direction. In front view in the axial direction, the guide grooves 112 are inclined upward as going outward in the width direction. As illustrated in FIGS. 5 and 7, the two guide grooves 112 communicate with the housing hole 111. Here, a hole through which each of the two guide grooves 112 communicates with the housing hole 111 is referred to as a communication hole 113. A position in the axial direction where the communication hole 113 is formed coincides with a position in the axial direction where the peripheral wall 131 is formed.

As illustrated in FIGS. 3 and 4, the fixing portion 140 has a disk shape whose plate thickness direction coincides with the axial direction. The fixing portion 140 is fixed to the end portion of the linear motion actuator 60. The connecting portion 150 has a columnar shape whose height direction coincides with the axial direction.

<Plate Spring 200>

As illustrated in FIGS. 3 and 4, the plate spring 200 has a C shape in front view in the axial direction. The plate spring 200 includes a base portion 210 having an arc shape and two clamping portions 220 that individually linearly extend from opposite end portions in a longitudinal direction of the base portion 210. In a distal end portion of each of the clamping portions 220, the center in the axial direction is recessed more than opposite end portions in the axial direction. In other words, the distal end portion of the clamping portion 220 has a shape corresponding to the ball 43. The plate spring 200 corresponds to an "elastic body". The plate spring 200 may be formed by, for example, bending a rectangular plate-shaped metal plate.

As illustrated in FIGS. 5 and 7, the plate spring 200 is mounted on the socket 100. The plate spring 200 is mounted on the socket 100 by being pushed toward the proximal end of the socket 100 through the two guide grooves 112 of the socket 100. At this time, the base portion 210 of the plate spring 200 extends along an outer peripheral surface of the peripheral wall 131 of the socket 100. In addition, the two clamping portions 220 of the plate spring 200 are individually inserted into the two communication holes 113 of the socket 100. As a result, the distal ends of the two clamping portions 220 of the plate spring 200 are located inside the housing hole 111 of the socket 100. Furthermore, the two clamping portions 220 of the plate spring 200 face each other in the width direction.

<Cover 300>

As illustrated in FIGS. 3 to 5, the cover 300 includes an upper wall 310, a regulating arm 320, two side walls 330, two first engaging portions 340, and two second engaging portions 350. The cover 300 is preferably made of a resin material having high strength and capable of injection molding.

The upper wall 310 has a size capable of covering the housing portion 110 and the connecting portion 150 of the socket 100. The upper wall 310 has a pressing portion 311 that presses the plate spring 200 mounted on the socket 100. The upper wall 310 also has a through hole 312 that passes through the upper wall 310 in the vertical direction.

The pressing portion 311 is a surface facing downward of the upper wall 310 and is a curved surface protruding upward. A curvature of the pressing portion 311 preferably corresponds to a curvature of the peripheral wall 131 of the socket 100, that is, a curvature of the base portion 210 of the plate spring 200. The pressing portion 311 is adjacent to the through hole 312 in the axial direction and is located at the center in the width direction. The through hole 312 has a rectangular shape whose shorter direction coincides with the width direction and whose longer direction coincides with the axial direction. The through hole 312 is located at the center in the width direction.

As illustrated in FIG. 5, the regulating arm 320 extends along the axial direction from a surface located on the proximal end side out of two surfaces intersecting the axial direction of the through hole 312. A proximal end of the regulating arm 320 is a fixed end, and a distal end of the regulating arm 320 is a free end. A lower surface of the distal end portion of the regulating arm 320 is inclined downward toward a distal end of the cover 300. A distal end surface of the regulating arm 320 is perpendicular to the axial direction. An upper surface of the regulating arm 320 is located below an opening edge of the through hole 312.

As illustrated in FIG. 4, the two side walls 330 individually extend downward from opposite end portions in the width direction of the upper wall 310. The two side walls 330 have a beam shape in which one end (upper end) in a longitudinal direction is a fixed end and the other end (lower end) in the longitudinal direction is a free end. Cross-sectional shapes perpendicular to the vertical direction of the two side walls 330 are rectangular shapes. The two side walls 330 have protrusions 331 protruding inward in the width direction. The protrusions 331 have a rib shape whose longitudinal direction coincides with the vertical direction. The protrusions 331 extend over the longitudinal direction of the side walls 330. Cross-sectional shapes perpendicular to the vertical direction of the protrusions 331 are semicircular shapes. That is, the cross-sectional shapes perpendicular to the vertical direction of the protrusions 331 correspond to the cross-sectional shapes perpendicular to the vertical direction of the first recesses 125 and the second recesses 126 of the socket 100. The cover 300 corresponds to a "first member" in having the protrusion 331.

The two first engaging portions 340 individually extend inward in the width direction from lower end portions of the two side walls 330. The first engaging portions 340 have a claw shape tapered toward their distal ends. Upper surfaces of the first engaging portions 340 are perpendicular to the side walls 330. The two first engaging portions 340 correspond to an "engaging portion".

The two second engaging portions 350 individually extend downward from opposite end portions in the width direction of the upper wall 310. The two second engaging portions 350 are shifted in the axial direction from the two side walls 330. In the present embodiment, the two second engaging portions 350 are located closer to the distal end of the cover 300 than to the two side walls 330. The two second engaging portions 350 have a triangular shape whose height direction coincides with the vertical direction. Bottom surfaces of the two second engaging portions 350 are parallel to the upper surfaces of the two first engaging portions 340. An interval between the two first engaging portions 340 and the two second engaging portions 350 is equal to a thickness in the vertical direction of the first housing wall 120 of the socket 100. Specifically, the interval between the two first engaging portions 340 and the two second engaging portions 350 is equal to an interval between the first locking surface 123 and the two second locking surfaces 124 of the socket 100. The two second engaging portions 350 correspond to the "engaging portion".

Operation of Present Embodiment

An operation in a case where the opening and closing device 50 is attached to the vehicle will be explained with reference to FIGS. 8 to 13.

Figure 8:
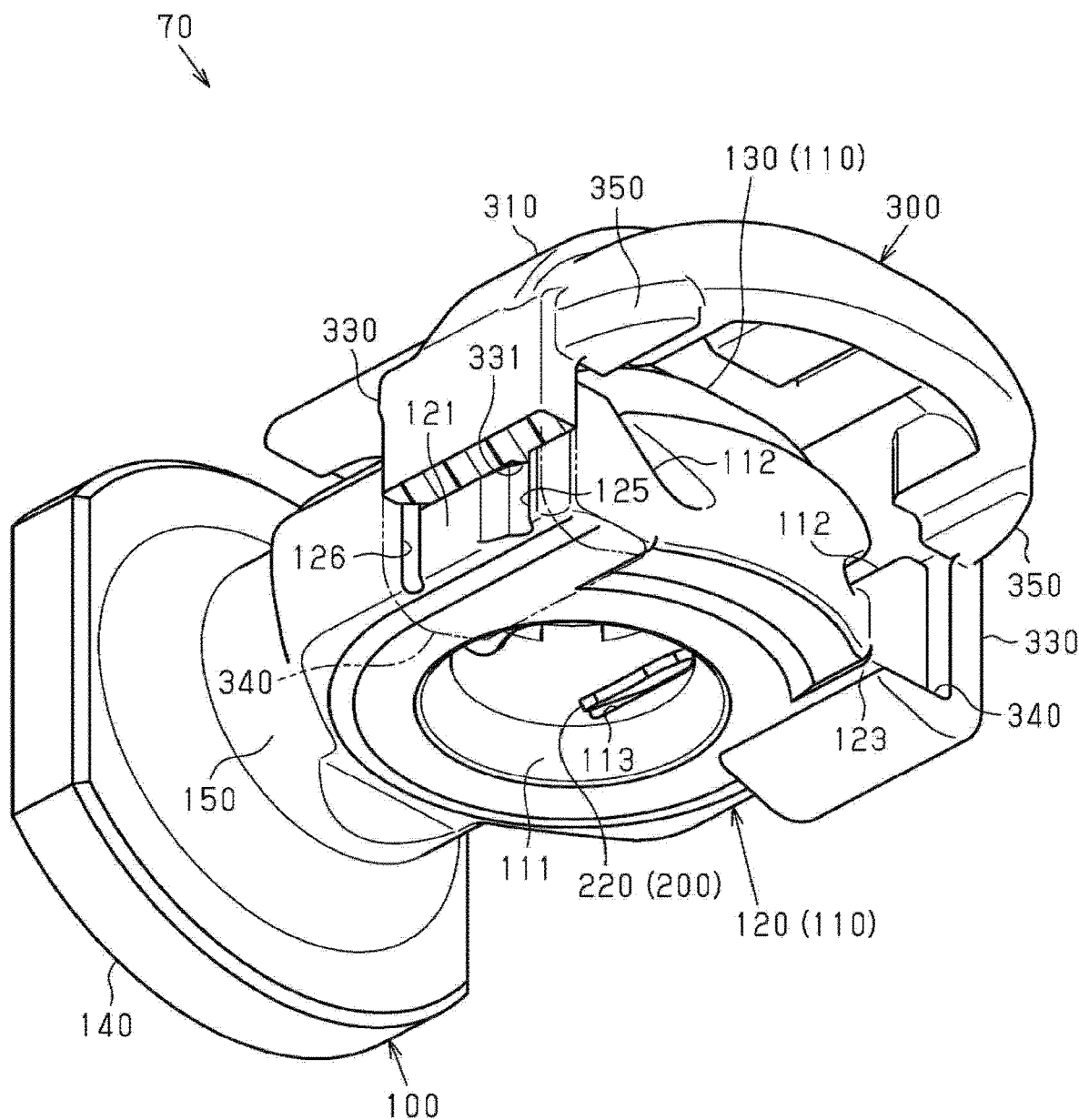
FIG. 8 is a perspective view of the coupling portion.
Figure 9:
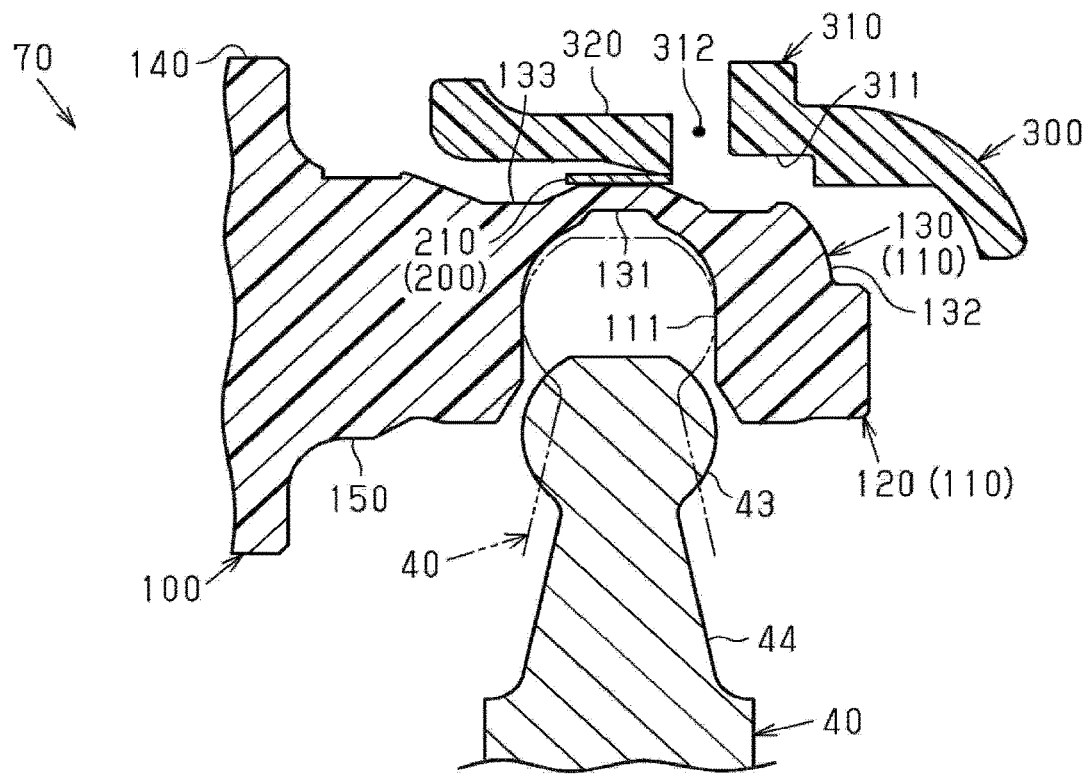
FIG. 9 is a cross-sectional view of the coupling portion when the cover is located at an allowing position.

As illustrated in FIGS. 8 and 9, in the opening and closing device 50 before being attached to the vehicle 10, the cover 300 is mounted on the socket 100. A mounting position of the cover 300 on the socket 100 at this time is referred to as an "allowing position".

When the mounting position of the cover 300 is the allowing position, the side walls 330 of the cover 300 are in contact with the sliding surfaces 121 of the socket 100 on opposite sides in the width direction of the coupling portion 70. In other words, the two side walls 330 of the cover 300 sandwich the first housing wall 120 of the socket 100 in the width direction. In this way, the cover 300 is positioned with respect to the socket 100 in the width direction. Furthermore, the protrusions 331 of the cover 300 are fitted into the first recesses 125 of the socket 100 on the opposite sides in the width direction of the coupling portion 70. In this way, the cover 300 is positioned with respect to the socket 100 in the axial direction.

As illustrated in FIG. 9, the distal end portion of the regulating arm 320 of the cover 300 pushes downward the base portion 210 of the plate spring 200 mounted on the socket 100. On the other hand, as illustrated in FIG. 8, the two first engaging portions 340 of the cover 300 are locked to the first locking surface 123 of the socket 100. In other words, the two first engaging portions 340 of the cover 300 are in contact with the first locking surface 123 of the socket 100 from below. In this way, the cover 300 uses the regulating arm 320 and the two first engaging portions 340 to sandwich the socket 100 and the plate spring 200 in the vertical direction. As a result, the cover 300 is positioned with respect to the socket 100 in the vertical direction.

The cover 300 is not separated from the socket 100 at the allowing position. In this respect, the allowing position is not a proper mounting position of the cover 300 on the socket 100, but a temporary mounting position for integrally handling the cover 300 with the socket 100.

When the opening and closing device 50 is attached to the vehicle 10, the coupling portion 71 of the opening and closing device 50 is coupled to the ball stud 41 of the vehicle body 20. The coupling portion 72 of the opening and closing device 50 is also coupled to the ball stud 42 of the back door 30. Specifically, as illustrated in FIG. 9, the coupling portion 70 of the opening and closing device 50 is pressed against the ball stud 40, so that the ball 43 is inserted into the housing hole 111 of the socket 100.

As indicated by a solid line and a two-dot chain line in FIG. 9, the ball 43 enters the housing hole 111 while spreading the two clamping portions 220 of the plate spring 200 apart. At this time, the plate spring 200 is displaced upward in an insertion direction of the ball 43 by a reaction force received from the ball 43. Since the distal end of the regulating arm 320 is in contact with the plate spring 200, the plate spring 200 is displaced upward together with the regulating arm 320 by the reaction force received from the ball 43. As described above, when the cover 300 is located at the allowing position, the displacement of the plate spring 200 with respect to the socket 100 is allowed. This enables the ball 43 to be inserted into the socket 100 while deforming the plate spring 200. When a portion having the largest diameter of the ball 43 passes between the two clamping portions 220 of the plate spring 200 in the vertical direction, the plate spring 200 starts to be restored. When the ball 43 reaches the bottom of the housing hole 111 as indicated by the two-dot chain line in FIG. 9, the ball 43 is sandwiched in the width direction between the two clamping portions 220 of the plate spring 200. In this way, the ball 43 is held by the socket 100 and the plate spring 200, and a ball joint is formed.

Figure 10:
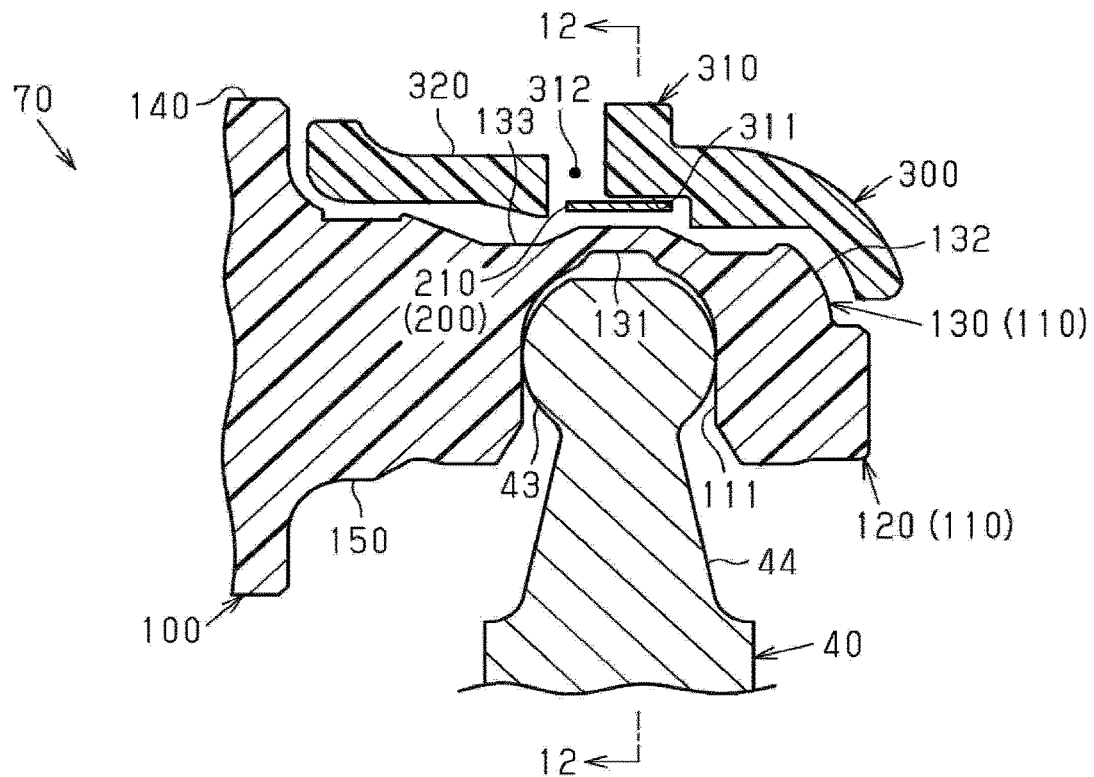
FIG. 10 is a cross-sectional view of the coupling portion when the cover is located at a restricting position.

Thereafter, as illustrated in FIGS. 9 and 10, the cover 300 is moved toward the proximal end in the axial direction of the socket 100 from the allowing position. At this time, on the opposite sides in the width direction of the coupling portion 70, the protrusions 331 of the side walls 330 of the cover 300 slide on the sliding surfaces 121 of the socket 100. In addition, the first engaging portions 340 of the cover 300 slide on the first locking surface 123 of the socket 100, and the regulating arm 320 of the cover 300 slides on the base portion 210 of the plate spring 200.

Figure 11:
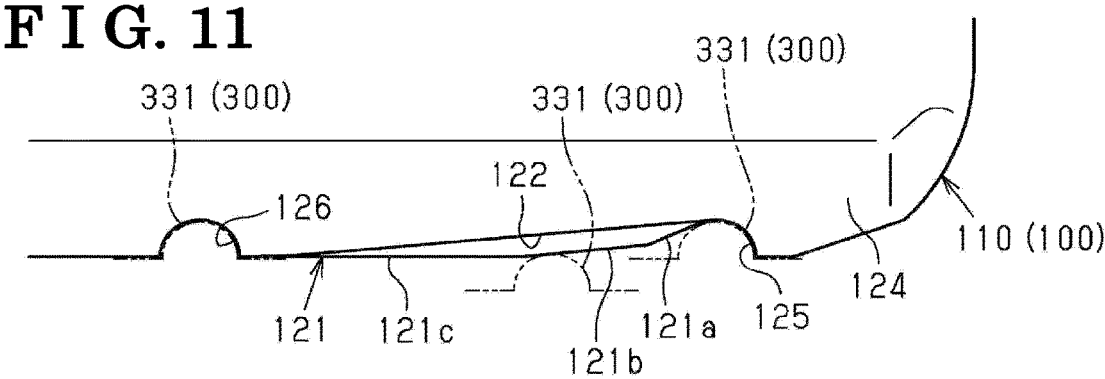
FIG. 11 is a plan view illustrating the cover moving with respect to a socket.

As illustrated in FIG. 11, when the cover 300 starts moving from the allowing position, the protrusion 331 of the cover 300 is disengaged from the first recess 125 of the socket 100 on each of the opposite sides in the width direction of the coupling portion 70. The protrusion 331 sequentially slides on the first sliding surface 121a, the second sliding surface 121b, and the third sliding surface 121c of the socket 100. At this time, the protrusion 331 of the cover 300 does not slide on the retracted surface 122 of the socket 100. That is, a portion of the protrusion 331 closer to the free end of the side wall 330 than to the fixed end of the side wall 330 slides on the sliding surface 121. In other words, the lower half of the protrusion 331 slides on the sliding surface 121 in a state where the upper half of the protrusion 331 is spaced apart from the retracted surface 122. Finally, the protrusion 331 is fitted into the second recess 126 of the socket 100. Hereinafter, the sliding movement between the protrusion 331 and the sliding surface 121 will be explained in detail.

The first sliding surface 121a is continuous with the inner peripheral surface of the first recess 125 in the axial direction. Therefore, the protrusion 331 is easily moved toward the second recess 126 from the state of being fitted in the first recess 125. However, the first sliding surface 121a has the largest angle with respect to the axial direction. Therefore, sliding resistance when the protrusion 331 slides on the first sliding surface 121a is large. In this respect, the protrusion 331 is easily disengaged from the first recess 125 but is difficult to move toward the second recess 126.

The second sliding surface 121b has a smaller angle with respect to the axial direction than the first sliding surface 121a. Therefore, sliding resistance when the protrusion 331 slides on the second sliding surface 121b is smaller than the sliding resistance when the protrusion 331 slides on the first sliding surface 121a. Hence, when an object on which the protrusion 331 slides is switched from the first sliding surface 121a to the second sliding surface 121b, the sliding resistance decreases stepwise. Consequently, when performing the work of attaching the opening and closing device 50 to the vehicle 10, an operator feels a click feeling.

The third sliding surface 121c has a smaller angle with respect to the axial direction than the second sliding surface 121b. Therefore, sliding resistance when the protrusion 331 slides on the third sliding surface 121c is smaller than the sliding resistance when the protrusion 331 slides on the second sliding surface 121b. Hence, when the object on which the protrusion 331 slides is switched from the second sliding surface 121b to the third sliding surface 121c, the sliding resistance decreases stepwise. However, since the angle of the third sliding surface 121c with respect to the axial direction is not greatly different from the angle of the second sliding surface 121b with respect to the axial direction, the click feeling felt by the operator is also reduced.

When the protrusion 331 finishes sliding on the third sliding surface 121c, the protrusion 331 is fitted into the second recess 126. In this way, the cover 300 is positioned with respect to the socket 100 in the axial direction. In the following description, a position of the cover 300 when the protrusion 331 is fitted into the second recess 126, that is, the mounting position of the cover 300 on the socket 100 illustrated in FIG. 10 is referred to as a "restricting position". In this respect, it can be said that the cover 300 can be mounted on the socket 100 at one of the allowing position or the restricting position.

As described above, the second recess 126 extends to a position higher than the first recess 125 in the vertical direction does. Therefore, in a case where the cover 300 tries to move in the axial direction when the protrusion 331 is fitted into the second recess 126, the side wall 330 of the cover 300 needs to be deformed such that the whole portion in the vertical direction of the protrusion 331 can climb over the edge of the second recess 126. On the other hand, in a case where the cover 300 tries to move in the axial direction toward the restricting position when the protrusion 331 is fitted into the first recess 125, the side wall 330 of the cover 300 only needs to be deformed such that the lower half of the protrusion 331 can climb over the edge of the first recess 125. That is, in the case where the protrusion 331 is fitted into the second recess 126, the cover 300 cannot move in the axial direction unless the side wall 330 of the cover 300 is greatly deformed as a whole. On the other hand, in the case where the protrusion 331 is fitted into the first recess 125, the cover 300 can move in the axial direction toward the restricting position even when the side wall 330 of the cover 300 is not greatly deformed as a whole. In this respect, a load required to move the cover 300 in the axial direction from the restricting position is greater than a load required to move the cover 300 from the allowing position to the restricting position. In the present embodiment, the first recess 125 is continuously connected to the first sliding surface 121a. Therefore, a load required to start moving the cover 300 from the allowing position toward the proximal end of the socket 100 is smaller than a load required to start moving the cover 300 from the allowing position toward the distal end of the socket 100.

Figure 12:
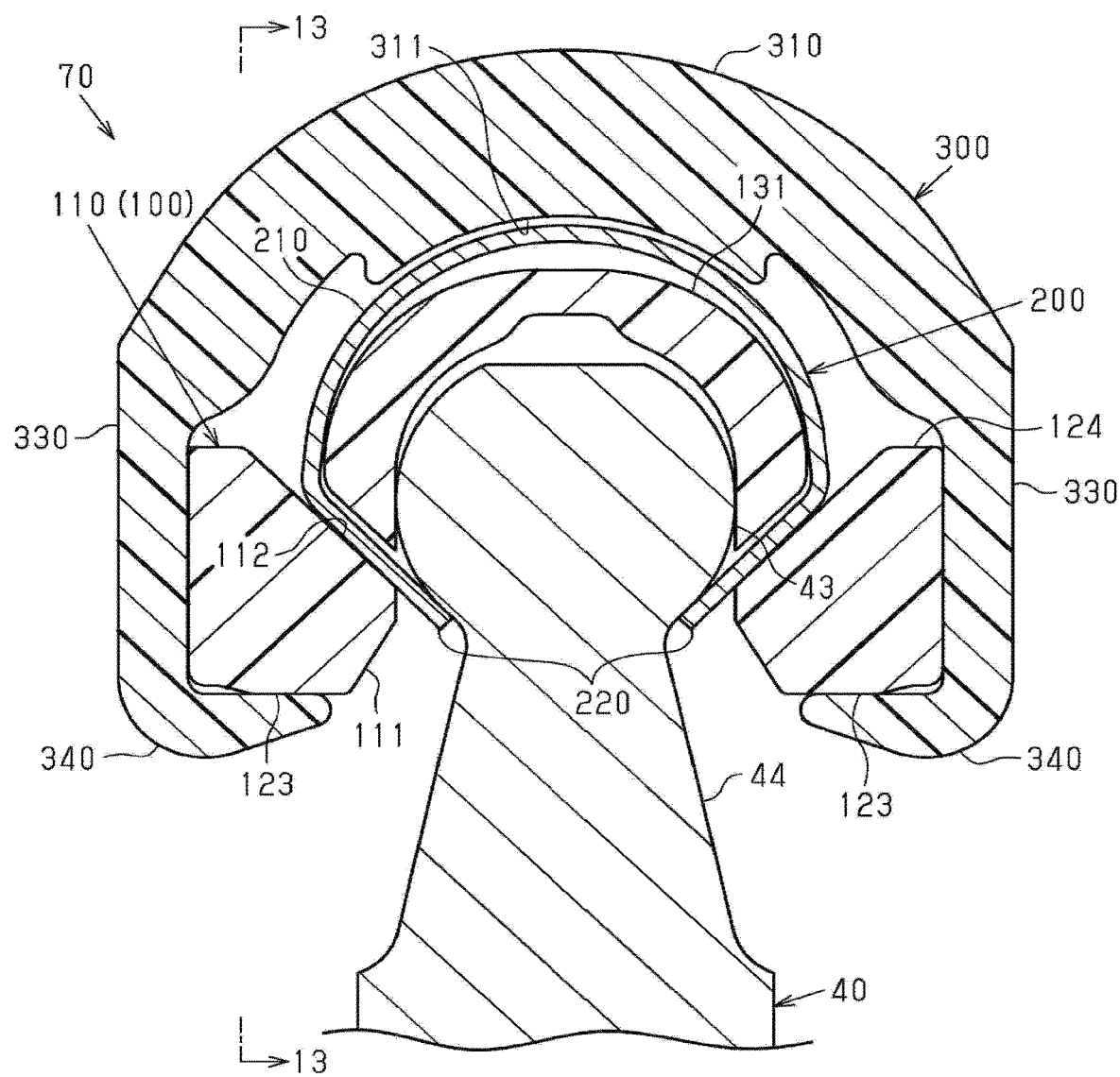
FIG. 12 is a cross-sectional view taken along line XII-XII in FIG. 10.

When the cover 300 is located at the restricting position as illustrated in FIG. 10, the distal end of the regulating arm 320 of the cover 300 and the plate spring 200 face each other in the axial direction. Furthermore, as illustrated in FIG. 12, the plate spring 200 is disposed between the pressing portion 311 of the cover 300 and the peripheral wall 131 of the socket 100 in the vertical direction. Here, the pressing portion 311 of the cover 300 has a curved surface shape corresponding to the base portion 210 of the plate spring 200. Therefore, the pressing portion 311 of the cover 300 faces the base portion 210 of the plate spring 200 in the vertical direction in a larger area.

The regulating arm 320 and the plate spring 200 may be in contact with each other to an extent not generating a contact load, or a slight gap may be formed between the regulating arm 320 and the plate spring 200. Similarly, the pressing portion 311 and the plate spring 200 may be in contact with each other to an extent not generating a contact load, or a slight gap may be formed between the pressing portion 311 and the plate spring 200. As described above, when the cover 300 is located at the restricting position, the displacement of the plate spring 200 with respect to the socket 100 is restricted. Therefore, even when a load acts in a direction in which the ball 43 is pulled out from the socket 100, the ball 43 is less likely to fall off from the socket 100.

Figure 13:
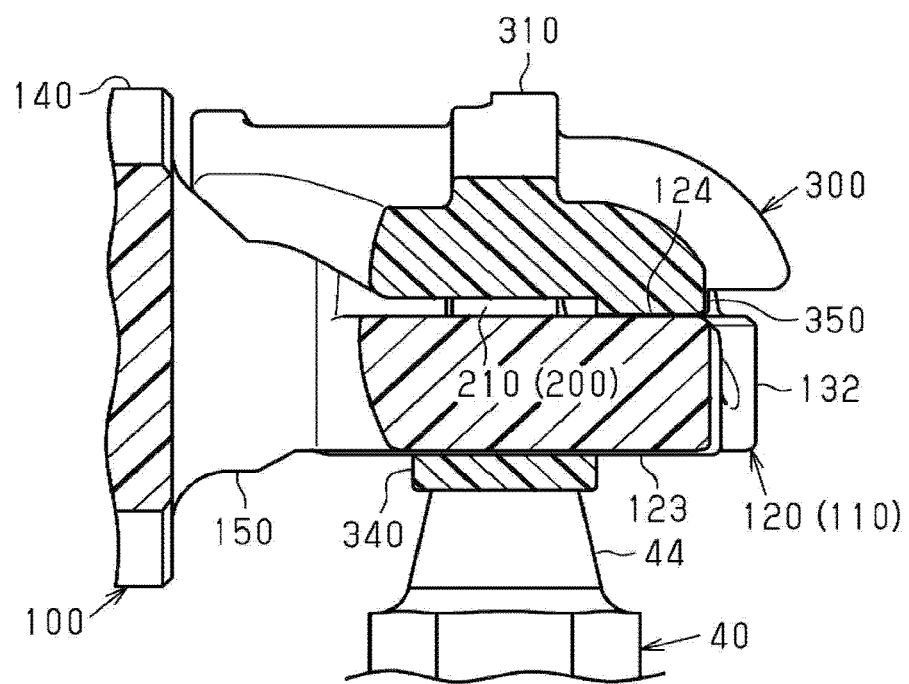
FIG. 13 is a cross-sectional view taken along line XIII-XIII in FIG. 12.

As illustrated in FIG. 13, when the cover 300 is located at the restricting position, the first engaging portions 340 and the second engaging portions 350 of the cover 300 sandwich the first housing wall 120 of the socket 100 in the vertical direction on the opposite sides in the width direction of the coupling portion 70. Specifically, the first engaging portions 340 of the cover 300 push the first locking surface 123 of the socket 100 upward, and the second engaging portions 350 of the cover 300 push the second locking surfaces 124 of the socket 100 downward. In this way, when the cover 300 is located at the restricting position, the cover 300 is positioned with respect to the socket 100 in the vertical direction by the engagement between the socket 100 and the cover 300.

Effects of Present Embodiment (1) An opening and closing device that couples together a vehicle body having an opening and an opening and closing body that opens and closes the opening, and extends to perform an opening operation of the opening and closing body, at least one of the vehicle body and the opening and closing body including a ball stud including a ball, the opening and closing device including: a shaft member having a shaft shape and being telescopic in an axial direction; a socket fixed to at least one end portion of the shaft member, including a housing portion configured to house the ball, and constituting a ball joint together with the ball; an elastic body supported by the socket and configured to hold the ball together with the socket; and a cover mounted at a restricting position where displacement of the elastic body with respect to the socket is restricted, wherein when a direction in which the ball is inserted into the socket is defined as an insertion direction, the cover includes two side walls that sandwich the housing portion in a direction perpendicular to the insertion direction, one of the housing portion and the side walls has a recess, and the other of the housing portion and the side walls has a protrusion that is fitted into the recess when the cover is located at the restricting position.

With the above configuration, the work of attaching the opening and closing device to the vehicle is performed in a state where the cover is not mounted at the restricting position. In this case, the elastic body is easily displaced with respect to the socket, so that the ball is more easily inserted into the socket while deforming the elastic body. After the ball is inserted into the socket, the cover is mounted on the socket at the restricting position. At this time, the two side walls of the cover sandwich the housing portion of the socket, and the protrusion is also fitted into the recess. The elastic body thereby becomes less likely to be displaced with respect to the socket, so that the ball is less likely to fall off from the socket. In this way, the opening and closing device can increase the coupling strength to the vehicle by firmly mounting the cover on the socket.

In other words, the work of attaching the opening and closing device 50 to the vehicle 10 is performed in a state where the cover 300 is not mounted at the restricting position. In this case, the plate spring 200 is easily displaced with respect to the socket 100, so that the ball 43 is more easily inserted into the socket 100 while elastically deforming the plate spring 200. After the ball 43 is inserted into the socket 100, the cover 300 is moved to the restricting position with respect to the socket 100. The plate spring 200 thereby becomes less likely to be displaced with respect to the socket 100, so that the ball 43 is less likely to fall off from the socket 100. In this way, the opening and closing device 50 can increase the coupling strength to the vehicle 10.

The opening and closing device can increase the coupling strength to the vehicle.

Furthermore, since the plate spring 200 is less likely to be displaced with respect to the socket 100, the socket 100 and the cover 300, which are resin parts, and the plate spring 200, which is a metal part, are less likely to slide on each other during the opening and closing operations of the back door 30. That is, the opening and closing device 50 can inhibit the socket 100 and the cover 300 from being scraped.

(2) In the opening and closing device, the cover is mounted on the socket at one of an allowing position where the displacement of the elastic body with respect to the socket is allowed and the restricting position, when the recess is defined as a second recess, one of the housing portion and the side walls has a first recess in addition to the second recess, and the protrusion is fitted into the first recess when the cover is located at the allowing position.

With the above configuration, when the cover is located at the allowing position, the two side walls of the cover sandwich the housing portion of the socket, and the protrusion is also fitted into the first recess. Therefore, the opening and closing device can increase the mounting strength of the cover located at the allowing position with respect to the socket.

In other words, when the ball 43 is housed in the socket 100 or taken out from the socket 100, the ball 43 passes between the two clamping portions 220 of the plate spring 200 while widening the interval between the two clamping portions 220. At this time, the base portion 210 of the plate spring 200 tries to lift upward from the peripheral wall 131 by the load acting on the two clamping portions 220. In this respect, the pressing portion 311 of the cover 300 restricts the displacement of the plate spring 200 by sandwiching the base portion 210 of the plate spring 200 in the insertion direction together with the peripheral wall 131 of the socket 100 at the restricting position. Therefore, the opening and closing device 50 can further inhibit the ball 43 from falling off from the socket 100 after the cover 300 is mounted at the restricting position.

(3) In the opening and closing device, the first recess and the second recess have a groove shape extending in a direction intersecting the axial direction, and when the direction in which the first recess and the second recess extend is defined as an extending direction, the cover includes an engaging portion that engages with the socket to restrict movement in the extending direction with respect to the socket.

With the above configuration, the opening and closing device can restrict the movement of the cover in the axial direction with respect to the socket by the protrusion being fitted into the first recess or the second recess. In addition, the opening and closing device can restrict the movement of the cover in the extending direction with respect to the socket by the engaging portion engaging with the socket. In this way, the opening and closing device can increase the mounting strength of the cover with respect to the socket at the restricting position and the allowing position.

In other words, when the cover 300 is located at the restricting position, the two side walls 330 of the cover 300 sandwich the housing portion 110 of the socket 100, and the protrusions 331 of the cover 300 are also fitted into the second recesses 126 of the socket 100. Therefore, the opening and closing device 50 can increase the mounting strength of the cover 300 located at the restricting position with respect to the socket 100.

(4) In the opening and closing device, the first recess has a shorter length than the second recess in the extending direction.

With the above configuration, in the opening and closing device, a force applied to the cover to release a state where the protrusion is fitted into the first recess is smaller than a force applied to the cover to release a state where the protrusion is fitted into the second recess. That is, the opening and closing device can inhibit the cover from being easily detached from the socket at the restricting position. The opening and closing device can also inhibit the cover from being difficult to detach from the socket at the allowing position.

In other words, when the cover 300 is located at the allowing position, the two side walls 330 of the cover 300 sandwich the housing portion 110 of the socket 100, and the protrusions 331 of the cover 300 are also fitted into the first recesses 125. Therefore, the opening and closing device 50 can increase the mounting strength of the cover 300 located at the allowing position with respect to the socket 100.

(5) In the opening and closing device, each of the side walls has a beam shape in which one end in a longitudinal direction of the side wall is a fixed end and the other end is a free end, and includes the protrusion extending over the longitudinal direction of the side wall, the housing portion has the first recess and the second recess, and a sliding surface on which the protrusion slides between the first recess and the second recess in the axial direction, and the cover moves from the allowing position to the restricting position by a portion of the protrusion closer to the free end of the side wall than to the fixed end of the side wall sliding on the sliding surface.

With the above configuration, for example, a comparative example will be considered in which a portion of the protrusion closer to the fixed end than to the free end of the side wall slides on the sliding surface. In this case, when the protrusion slides on the sliding surface, the portion close to the fixed end of the side wall needs to be greatly deformed, so that sliding resistance when the cover is moved from the allowing position to the restricting position tends to increase. On the other hand, in the opening and closing device having the above configuration, the portion of the protrusion closer to the free end than to the fixed end of the side wall slides on the sliding surface. Therefore, when the protrusion slides on the sliding surface, it is not necessary to greatly deform the portion close to the fixed end of the side wall, so that the sliding resistance when the cover is moved from the allowing position to the restricting position tends to decrease.

In other words, the first recesses 125 have a shorter length than the second recesses 126 in the vertical direction. Therefore, a force applied to the cover 300 to release a state where the protrusions 331 are fitted into the first recesses 125 is smaller than a force applied to the cover 300 to release a state in which the protrusions 331 are fitted into the second recesses 126. That is, the opening and closing device 50 can inhibit the cover 300 from being easily detached from the socket 100 at the restricting position. The opening and closing device 50 can also inhibit the cover 300 from being difficult to detach from the socket 100 at the allowing position.

On the other hand, the edges on the distal end side of the first recesses 125 have a longer length than the edges on the proximal end side of the first recesses 125 in the vertical direction. Therefore, the cover 300 easily moves in a direction from the allowing position to the restricting position with a relatively small force, whereas the cover 300 is less likely to move in a direction opposite to this direction from the allowing position with a relatively small force. As a result, the opening and closing device 50 can reduce the possibility that the cover 300 is unexpectedly detached from the allowing position.

(6) In the opening and closing device, when between the socket and the cover, a member having the protrusion is defined as a first member and a member having the first recess and the second recess is defined as a second member, the second member includes a sliding surface on which the protrusion slides between the first recess and the second recess in the axial direction, the cover moves from the allowing position to the restricting position by the protrusion sliding on the sliding surface, the sliding surface includes a first sliding surface connected to the first recess and a second sliding surface connected to the first sliding surface and extending toward the second recess, and the second sliding surface has a different inclination with respect to the axial direction from the first sliding surface.

With the above configuration, when the cover moves from the allowing position to the restricting position, the protrusion slides on the first sliding surface, and then slides on the second sliding surface having a different inclination from the first sliding surface. Therefore, when moving the cover from the allowing position to the restricting position, an operator who attaches the opening and closing device to the vehicle can feel a click feeling with the protrusion passing through a boundary between the first sliding surface and the second sliding surface. This enables the opening and closing device to inform the operator that the cover is being correctly moved.

In other words, the movement of the cover 300 in the axial direction with respect to the socket 100 is restricted at the allowing position or the restricting position by the rib-shaped protrusions 331 being fitted into the groove-shaped first recesses 125 or second recesses 126. In addition, the movement of the cover 300 in the vertical direction with respect to the socket 100 is restricted at the allowing position or the restricting position by the first engaging portions 340 engaging with the socket 100. Furthermore, the movement of the cover 300 in the width direction with respect to the socket 100 is restricted at the allowing position or the restricting position by the two side walls 330 sandwiching the socket 100 in the width direction. In this way, the opening and closing device 50 can increase the mounting strength of the cover 300 with respect to the socket 100 at the restricting position and the allowing position.

(7) In the opening and closing device, the inclination of the first sliding surface with respect to the axial direction is larger than the inclination of the second sliding surface with respect to the axial direction.

With the above configuration, when the operator moves the cover from the allowing position toward the restricting position, the protrusion disengaged from the first recess first slides on the first sliding surface. Therefore, the operator needs to apply a relatively large force to the cover when starting to move the cover from the allowing position. In other words, it can be said that the cover located at the allowing position is difficult to move from the allowing position toward the restricting position. In this respect, the opening and closing device can inhibit the cover from unexpectedly moving from the allowing position toward the restricting position when being carried or the like.

In other words, for example, a comparative example will be considered in which the upper halves of the protrusions 331 of the cover 300 slide on the sliding surfaces 121 of the socket 100. In this case, when the protrusions 331 slide on the sliding surfaces 121, the portions close to the fixed ends of the side walls 330 of the cover 300 need to be greatly deformed, so that sliding resistance when the cover 300 is moved from the allowing position to the restricting position tends to increase. On the other hand, in the opening and closing device 50, the lower halves of the protrusions 331 of the cover 300 slide on the sliding surfaces 121 of the socket 100. Therefore, when the protrusions 331 slide on the sliding surfaces 121, it is not necessary to greatly deform the portions close to the fixed ends of the side walls 330, so that the sliding resistance when the cover 300 is moved from the allowing position to the restricting position tends to decrease.

(8) In the opening and closing device, the housing portion includes a peripheral wall having an arc shape as viewed from a direction perpendicular to the insertion direction, and houses the ball while covering the ball with the peripheral wall, the elastic body is a plate spring including a base portion that extends along an outer peripheral surface of the peripheral wall and two clamping portions that individually extend from opposite ends of the base portion to sandwich the ball housed in the housing portion, the cover includes a pressing portion that restricts displacement of the plate spring by sandwiching the base portion of the plate spring in the insertion direction together with the peripheral wall at the restricting position, and the pressing portion has a curved surface shape along the base portion of the plate spring.

With the above configuration, when the ball is housed in the socket or taken out from the socket, the ball passes between the two clamping portions of the plate spring while widening the interval between the two clamping portions. At this time, the base portion of the plate spring tries to lift up from the peripheral wall by the load acting on the two clamping portions. In this respect, the pressing portion of the cover restricts the displacement of the plate spring by sandwiching the base portion of the plate spring in the insertion direction together with the peripheral wall of the socket at the restricting position. Therefore, the opening and closing device can further inhibit the ball from falling off from the socket after the cover is mounted at the restricting position.

Here, when the pressing portion has a planar shape, the contact area between the pressing portion and the plate spring tends to be small. In this case, when the ball moves relative to the socket, the effect of inhibiting the displacement of the plate spring by the pressing portion is reduced. On the other hand, in the opening and closing device, the pressing portion has the curved surface shape along the base portion of the plate spring. Therefore, the contact area between the pressing portion and the plate spring can be increased. As a result, the opening and closing device can enhance the effect of inhibiting the displacement of the plate spring by the pressing portion.

In other words, when the cover 300 is moved from the allowing position to the restricting position, the protrusions 331 slide on the first sliding surfaces 121*a*, and then slide on the second sliding surfaces 121*b* having a different inclination from the first sliding surfaces 121*a*. Therefore, when moving the cover 300 from the allowing position to the restricting position, an operator who attaches the opening and closing device 50 to the vehicle 10 can feel a click feeling with the protrusions 331 passing through a boundary between the first sliding surfaces 121*a* and the second sliding surfaces 121*b*. This enables the opening and closing device 50 to inform the operator that the cover 300 is being correctly moved.

(9) In the opening and closing device, the cover includes a first engaging portion in contact with the housing portion from the insertion direction and a second engaging portion in contact with the housing portion from a direction opposite to the insertion direction, and when the cover is located at the restricting position, the first engaging portion and the second engaging portion sandwich the housing portion in the insertion direction.

With the above configuration, in the opening and closing device, the cover is positioned with respect to the socket in the insertion direction by the first engaging portion and the second engaging portion sandwiching the housing portion. Therefore, the opening and closing device can inhibit the cover from moving with respect to the socket even when the plate spring is displaced along with movement of the ball stud with respect to the socket.

In other words, when the operator moves the cover 300 from the allowing position toward the restricting position, the protrusions 331 disengaged from the first recesses 125 first start sliding on the first sliding surfaces 121*a*. Therefore, the operator needs to apply a relatively large force to the cover 300 when starting to move the cover 300 from the allowing position. In other words, it can be said that the cover 300 located at the allowing position is difficult to move from the allowing position toward the restricting position. In this respect, the opening and closing device 50 can inhibit the cover 300 from unexpectedly moving from the allowing position toward the restricting position during carriage or the like of the opening and closing device 50.

(10) For example, when the pressing portion 311 has a planar shape, the contact area between the pressing portion 311 and the plate spring 200 tends to be small. In this case, the effect of inhibiting the displacement of the plate spring 200 by the pressing portion 311 is reduced. On the other hand, in the opening and closing device 50, the pressing portion 311 has the curved surface shape along the base portion 210 of the plate spring 200. Therefore, the contact area between the pressing portion 311 and the plate spring 200 can be increased. As a result, the opening and closing device 50 can enhance the effect of inhibiting the displacement of the plate spring 200 by the pressing portion 311.

(11) For example, a comparative example will be considered in which the socket 100 does not include the second engaging portions 350. In the comparative example, the cover 300 is positioned with respect to the socket 100 in the vertical direction by sandwiching the base portion 210 of the plate spring 200 and the first locking surface 123 of the socket 100 in the vertical direction. Therefore, when the plate spring 200 is displaced by the ball 43 moving relative to the socket 100, the cover 300 may move unexpectedly along with the displacement of the plate spring 200. In this respect, in the opening and closing device 50, the cover 300 is positioned with respect to the socket 100 in the insertion direction by the first engaging portions 340 and the second engaging portions 350 of the cover 300 sandwiching the socket 100. In addition, the first engaging portions 340 and the second engaging portions 350 of the cover 300 extend in the front-rear direction. Therefore, the cover 300 is less likely to rotate about an axis extending in the width direction. Consequently, the opening and closing device 50 can inhibit the cover 300 from moving with respect to the socket 100 even when the plate spring 200 is displaced by the movement of the ball 43 relative to the socket 100.

(12) In order to move the cover 300 from the restricting position toward the allowing position, the distal end of the regulating arm 320 of the cover 300 needs to be displaced to a position higher than the base portion 210 of the plate spring 200. In this respect, as illustrated in FIG. 3, the upper surface of the regulating arm 320 is recessed below the upper wall 310 of the cover 300. Therefore, the opening and closing device 50 can avoid a situation in which the cover 300 moves from the restricting position toward the allowing position as a result of a user of the vehicle 10 erroneously touching the regulating arm 320 of the cover 300.

Modification Examples

The present embodiment can be modified as follows. The present embodiment and the following modification examples can be implemented in combination with each other within a range not technically contradictory.

The pressing portion 311 of the cover 300 may have a planar shape.

The cover 300 does not have to include the second engaging portions 350. In this case, when the cover 300 is mounted at the restricting position, the pressing portion 311 is in contact with the base portion 210 of the plate spring 200, and the first engaging portions 340 are in contact with the first locking surface 123 of the socket 100.

In the socket 100, each sliding surface 121 may be a single flat surface or curved surface. In this case, the sliding surface 121 may extend along the axial direction or may be inclined with respect to the axial direction.

In the socket 100, the positional relationship between each sliding surface 121 and each retracted surface 122 in the vertical direction may be reversed. That is, the lower end of the sliding surface 121 and the upper end of the retracted surface 122 may be connected.

In the socket 100, the vertical length of the first recesses 125 may be equal to the vertical length of the second recesses 126. In this case, the socket 100 does not have to include the retracted surfaces 122.

In the socket 100, the second recesses 126 may have a greater depth than the first recesses 125. As a result, the protrusions 331 of the cover 300 may be more firmly fitted into the second recesses 126.

In the socket 100 and the cover 300, the shapes of the protrusions 331, the first recesses 125, and the second recesses 126 can be changed as appropriate. For example, the protrusions 331, the first recesses 125, and the second recesses 126 may have a male shape and a female shape constituting a so-called snap-fit.

The socket 100 may include two protrusions instead of each first recess 125 and each second recess 126. In this case, it is preferable that the cover 300 has one recess into which the two protrusions are fitted instead of each protrusion 331. According to this modification example, when the cover 300 is located at the allowing position, one of the protrusions of the socket 100 is fitted into the recess of the cover 300, and when the cover 300 is located at the restricting position, the other protrusion of the socket 100 is fitted into the recess of the cover 300. In this modification example, the socket 100 corresponds to the "first member", and the cover 300 corresponds to the "second member".

The cover 300 may be positioned at the allowing position or the restricting position by a frictional force with the socket 100. That is, the cover 300 is not limited to one positioned on the socket 100 with the protrusions 331 fitted into the first recesses 125 or the second recesses 126.

The cover 300 does not have to include the regulating arm 320. In this case, it is preferable that the cover 300 has a configuration of restricting the displacement of the plate spring 200 in the axial direction at the restricting position.

The plate spring 200 may be an elastic body made of an elastomer such as rubber and resin. In this case, it is preferable that at least a part of the elastic body is located above the peripheral wall 131 of the socket 100, and at least a part of the elastic body is located inside the housing hole 111 of the socket 100.

In the above embodiment, the depth direction of the housing hole 111 of the socket 100 fixed to the first end of the linear motion actuator 60 and the depth direction of the housing hole 111 of the socket 100 fixed to the second end of the linear motion actuator 60 face in the same direction. Depending on how the ball studs 40 are fixed to the vehicle body 20 and the back door 30, the depth directions of the housing holes 111 of the two sockets 100 may be directed in different directions.

One of the coupling portions 70 of the opening and closing device 50 does not have to constitute the ball joint together with the vehicle body 20 or the back door 30. One of the coupling portions 70 of the opening and closing device 50 may constitute a universal joint such as a hook joint together with the vehicle body 20 or the back door 30.

The opening and closing device 50 may be a so-called gas spring or gas damper. In this case, a portion extended by a reaction force of gas corresponds to the "shaft member". The opening and closing device according to this modification example can apply a load in the opening direction to the back door 30, but cannot apply a load in the closing direction to the back door 30. That is, the opening and closing device can open the back door 30 but cannot close the back door 30.

The opening and closing body provided with the opening and closing device 50 may be a door other than the back door 30. For example, the opening and closing body may be a front door and a rear door as a swing door.

The opening and closing body as the opening and closing target of the opening and closing device 50 is not necessarily a door. For example, the opening and closing body may be a hood panel or a fuel lid.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opening and closing device that couples together a vehicle body having an opening and an opening and closing body that opens and closes the opening, and extends to perform an opening operation of the opening and closing body,
at least one of the vehicle body and the opening and closing body including a ball stud including a ball,
the opening and closing device comprising:
a shaft member having a shaft shape and being telescopic in an axial direction;
a socket fixed to at least one end portion of the shaft member, including a housing portion configured to house the ball, and constituting a ball joint together with the ball;
an elastic body supported by the socket and configured to hold the ball together with the socket; and
a cover mounted at a restricting position where displacement of the elastic body with respect to the socket is restricted, wherein
when a direction in which the ball is inserted into the socket is defined as an insertion direction,
the cover includes two side walls that sandwich the housing portion in a direction perpendicular to the insertion direction,
one of the housing portion and the side walls has a recess,
the other of the housing portion and the side walls has a protrusion that is fitted into the recess when the cover is located at the restricting position,
the cover is mounted on the socket at one of an allowing position where the displacement of the elastic body with respect to the socket is allowed and the restricting position,
when the recess is defined as a second recess, one of the housing portion and the side walls has a first recess in addition to the second recess, and
the protrusion is fitted into the first recess when the cover is located at the allowing position.

2. The opening and closing device according to claim 1, wherein
the first recess and the second recess have a groove shape extending in a direction intersecting the axial direction, and
when the direction in which the first recess and the second recess extend is defined as an extending direction,
the cover includes an engaging portion that engages with the socket to restrict movement in the extending direction with respect to the socket.

3. The opening and closing device according to claim 2, wherein
the first recess has a shorter length than the second recess in the extending direction.

4. The opening and closing device according to claim 3, wherein
each of the side walls has a beam shape in which one end in a longitudinal direction of the side wall is a fixed end and the other end is a free end, and has the protrusion extending over the longitudinal direction of the side wall,
the housing portion has the first recess and the second recess, and a sliding surface on which the protrusion slides between the first recess and the second recess in the axial direction, and
the cover moves from the allowing position to the restricting position by a portion of the protrusion closer to the free end of the side wall than to the fixed end of the side wall sliding on the sliding surface.

5. The opening and closing device according to claim 4, wherein
when between the socket and the cover, a member having the protrusion is defined as a first member and a member having the first recess and the second recess is defined as a second member,
the second member includes a sliding surface on which the protrusion slides between the first recess and the second recess in the axial direction,
the cover moves from the allowing position to the restricting position by the protrusion sliding on the sliding surface,
the sliding surface includes a first sliding surface connected to the first recess and a second sliding surface connected to the first sliding surface and extending toward the second recess, and
the second sliding surface has a different inclination with respect to the axial direction from the first sliding surface.

6. The opening and closing device according to claim 5, wherein
the inclination of the first sliding surface with respect to the axial direction is larger than the inclination of the second sliding surface with respect to the axial direction.

7. The opening and closing device according to claim 2, wherein
each of the side walls has a beam shape in which one end in a longitudinal direction of the side wall is a fixed end and the other end is a free end, and has the protrusion extending over the longitudinal direction of the side wall, the housing portion has the first recess and the second recess, and a sliding surface on which the protrusion slides between the first recess and the second recess in the axial direction, and the cover moves from the allowing position to the restricting position by a portion of the protrusion closer to the free end of the side wall than to the fixed end of the side wall sliding on the sliding surface.

8. The opening and closing device according to claim 2, wherein when between the socket and the cover, a member having the protrusion is defined as a first member and a member having the first recess and the second recess is defined as a second member, the second member includes a sliding surface on which the protrusion slides between the first recess and the second recess in the axial direction, the cover moves from the allowing position to the restricting position by the protrusion sliding on the sliding surface, the sliding surface includes a first sliding surface connected to the first recess and a second sliding surface connected to the first sliding surface and extending toward the second recess, and the second sliding surface has a different inclination with respect to the axial direction from the first sliding surface.

9. The opening and closing device according to claim 8, wherein the inclination of the first sliding surface with respect to the axial direction is larger than the inclination of the second sliding surface with respect to the axial direction.

10. The opening and closing device according to claim 1, wherein when between the socket and the cover, a member having the protrusion is defined as a first member and a member having the first recess and the second recess is defined as a second member, the second member includes a sliding surface on which the protrusion slides between the first recess and the second recess in the axial direction, the cover moves from the allowing position to the restricting position by the protrusion sliding on the sliding surface, the sliding surface includes a first sliding surface connected to the first recess and a second sliding surface connected to the first sliding surface and extending toward the second recess, and the second sliding surface has a different inclination with respect to the axial direction from the first sliding surface.

11. The opening and closing device according to claim 10, wherein the inclination of the first sliding surface with respect to the axial direction is larger than the inclination of the second sliding surface with respect to the axial direction.

12. The opening and closing device according to claim 1, wherein the cover includes a first engaging portion in contact with the housing portion from the insertion direction and a second engaging portion in contact with the housing portion from a direction opposite to the insertion direction, and when the cover is located at the restricting position, the first engaging portion and the second engaging portion sandwich the housing portion in the insertion direction.

13. An opening and closing device that couples together a vehicle body having an opening and an opening and closing body that opens and closes the opening, and extends to perform an opening operation of the opening and closing body, at least one of the vehicle body and the opening and closing body including a ball stud including a ball, the opening and closing device comprising:

a shaft member having a shaft shape and being telescopic in an axial direction;

a socket fixed to at least one end portion of the shaft member, including a housing portion configured to house the ball, and constituting a ball joint together with the ball;

an elastic body supported by the socket and configured to hold the ball together with the socket; and a cover mounted at a restricting position where displacement of the elastic body with respect to the socket is restricted, wherein when a direction in which the ball is inserted into the socket is defined as an insertion direction, the cover includes two side walls that sandwich the housing portion in a direction perpendicular to the insertion direction, one of the housing portion and the side walls has a recess, the other of the housing portion and the side walls has a protrusion that is fitted into the recess when the cover is located at the restricting position, the housing portion includes a peripheral wall having an arc shape as viewed from a direction perpendicular to the insertion direction, and houses the ball while covering the ball with the peripheral wall, the elastic body is a plate spring including a base portion that extends along an outer peripheral surface of the peripheral wall and two clamping portions that individually extend from opposite ends of the base portion to sandwich the ball housed in the housing portion, the cover includes a pressing portion that restricts displacement of the plate spring by sandwiching the base portion of the plate spring in the insertion direction together with the peripheral wall at the restricting position, and the pressing portion has a curved surface shape along the base portion of the plate spring.

14. The opening and closing device according to claim 13, wherein the cover includes a first engaging portion in contact with the housing portion from the insertion direction and a second engaging portion in contact with the housing portion from a direction opposite to the insertion direction, and when the cover is located at the restricting position, the first engaging portion and the second engaging portion sandwich the housing portion in the insertion direction.

\* \* \* \* \*